United States Patent [19]

Davis

[11] Patent Number: 4,683,672
[45] Date of Patent: Aug. 4, 1987

[54] COLLAPSIBLE GAME BLIND

[76] Inventor: Dave A. Davis, P.O. Box 185, Rockport, Tex. 78382

[21] Appl. No.: 892,205

[22] Filed: Aug. 4, 1986

[51] Int. Cl.⁴ .......................................... A01M 31/00
[52] U.S. Cl. ........................................... 43/1; 135/901
[58] Field of Search ................................ 43/1; 135/901

[56] References Cited

U.S. PATENT DOCUMENTS

| | | | |
|---|---|---|---|
| Re. 26,140 | 1/1967 | Schoenike | 135/901 |
| 2,311,515 | 2/1943 | Bridge | 135/901 |
| 2,464,884 | 3/1949 | Noyes . | |
| 2,811,977 | 11/1957 | McClish | 135/901 |
| 3,027,189 | 3/1962 | Scott . | |
| 3,131,704 | 5/1964 | Shimon | 135/901 |
| 3,509,891 | 5/1970 | De Bolt | 135/901 |
| 3,799,608 | 3/1974 | Smutny et al. | 135/901 |
| 4,483,090 | 11/1984 | Carper | 43/1 |

*Primary Examiner*—M. Jordan
*Attorney, Agent, or Firm*—G. Turner Moller

[57] ABSTRACT

A game blind includes a sled like base so it may be pulled behind a walking hunter. The game blind includes a framework movable to a first position where camouflage material is deployed in front of a seat supported on the base. When game birds arrive, the hunter trips a latch mechanism to move the camouflage material out of the way thereby allowing a shot over the top of the camouflage material. A dry box supports the seat above the base and provides a convenient storage location. The game blind may be used by camera buffs or rifle hunters by sighting through a slit in the camouflage material.

11 Claims, 3 Drawing Figures

COLLAPSIBLE GAME BLIND

This invention relates to a game blind and more particularly to a collapsible game blind of the type used by hunters, fishermen, camera buffs or the like.

Game blinds are widely used by hunters, fisherman, camera buffs and the like to accomplish two things. First, the blind must disguise or camouflage the user from his intended quarry. Thus, blinds are widely used by hunters or cameramen to obtain close up shots of game, either birds or mammals. Second, it is desirable that game blinds provide some protection from the elements. Fishermen, of course, normally do not need to be camouflaged and thus use blinds only for protection from the weather.

Game blinds are quite common in deer hunting country where an enclosure is positioned on long legs to elevate the hunter above a game trail or cindera. These type blinds hide the hunter as well as provide considerable creature comforts, such as a roof and a comfortable chair. Although game blinds of this type are widely used in deer hunting areas, they are inappropriate for other types of hunting and other types of terrain. For example, one cannot hunt birds from these elevated game blinds because they are roofed and birds obviously fly overhead. In addition, these type blinds are not used in marshes or wetlands because they are difficult to transport across wet, roadless terrain to the desired location, they are conspicuous, and the long slender legs will sink into the mud.

Disclosures of some interest relative to this invention are found in U.S. Pat. Nos. 2,464,884 and 3,027,189.

Although the game blind of this invention provides some protection against the weather, it is primarily intended to camouflage or disguise a hunter or cameraman. As will be more fully apparent hereinafter, the game blind is particularly designed to be used by hunters in marshy or wetland areas.

To these ends, the game blind of this invention comprises a base which resembles a sled to the extent that it can be pulled behind a walking person by the use of a tow rope. In an early prototype of this invention, the back of the game blind was uncamouflaged. Thus, this type blind would be placed in front of a tree or bush to break the outline of the blind and to disguise the rear of the blind. Although later models of the blind camouflage the rear thereof, it is still preferred that the blind be placed in front of a bush or tree to break the outline of the blind. The hunter's decoys, if any, are deployed to the hunter's front.

On one end of the base is large dry box having a seat on the lid thereof. The box provides a dry place for shotgun shells, lunch, a Thermos jug or the like and a sturdy support for the seat. A first immobile inverted generally U-shaped strut is attached to the base and provides a support for camouflage or weather protection material on the rear of the blind. A pair of inverted generally U-shaped struts are pivotally connected to either the box or the base and comprise a framework for receiving camouflage material, such as netting, camouflage cloth, i.e. cloth of mottled brown, green and gray color, or the like. The U-shaped struts are movable to an upright position deploying the camouflage material in front of the seat where the hunter sits while waiting for the arrival of game. The struts are biased, either by gravity, a spring member or both, toward a collapsed position residing on the base. The struts are held in their upright position by a latch mechanism.

If the hunter is hunting birds and they arrive within range of the blind, the hunter trips the latch mechanism which causes the struts to fall onto the base of the blind and leave the area immediately to the front of the hunter unobstructed so the hunter can fire over the top of the collapsed, or collapsing, framework. If the hunter has killed a bird, it can be retrieved and placed on the base of the blind or in the dry box. The hunter then sits on the seat and elevates the struts to their upright position merely by elevating the rearward or upper strut and latching it in place.

In the event the blind is used by a camera buff or deer hunter, a slit may be provided in the camouflage material to the front of the seat to receive the end of the camera or rifle therethrough.

It is accordingly an object of this invention to provide a new and improved game blind.

Another object of this invention is to provide an improved game blind which may be towed behind a walking person.

A further object of this invention is to provide an improved game blind which is movable from a first position obscuring a hunter to a second position leaving the area immediately to the hunter's front unobstructed.

Other objects and advantages of this invention will become more fully apparent as this description proceeds, reference being made to the accompanying drawings and appended claims.

IN THE DRAWINGS

Figure 1:
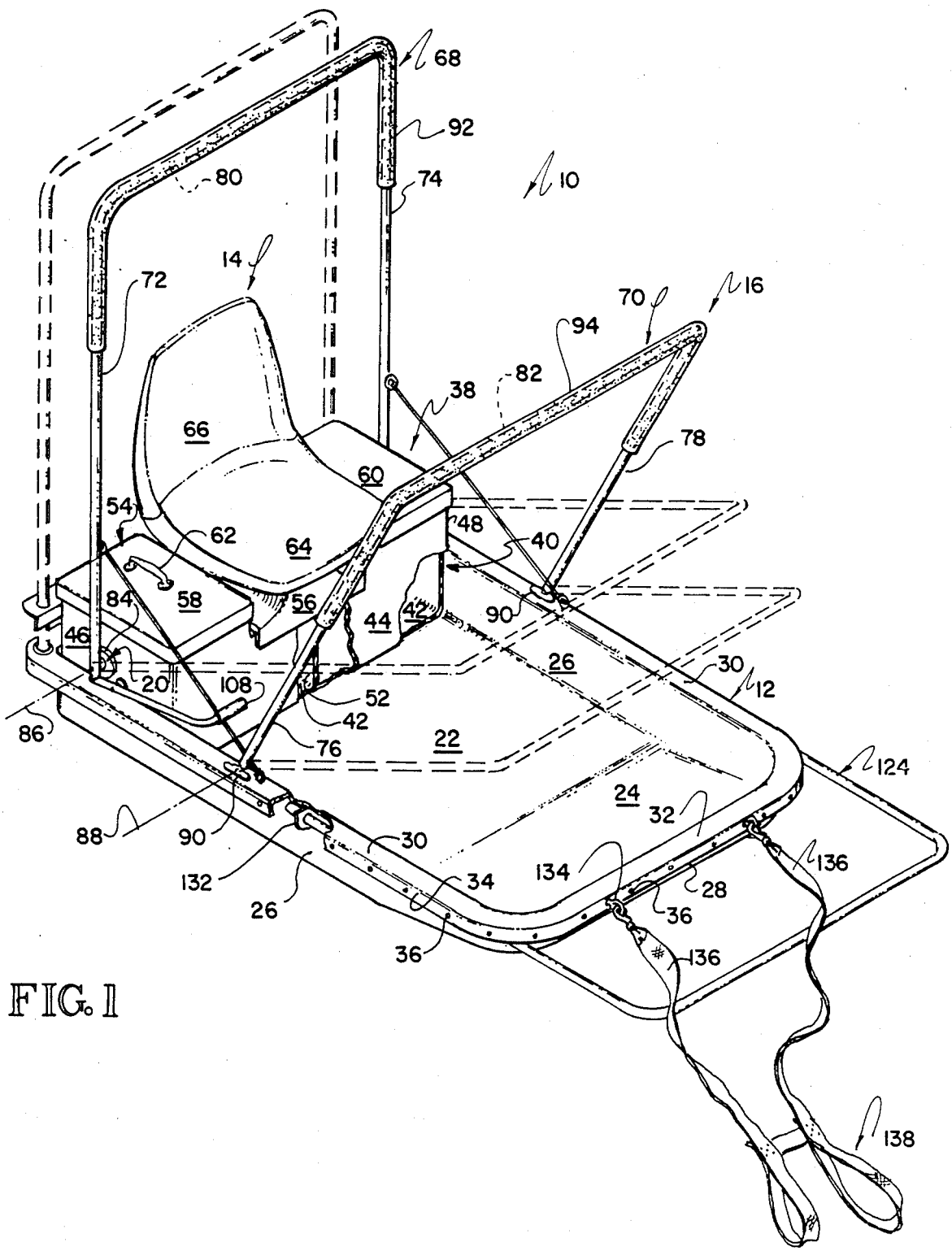
FIG. 1 is an isometric view of the game blind of this invention from the front thereof, illustrated the movement of the framework.
Figure 2:
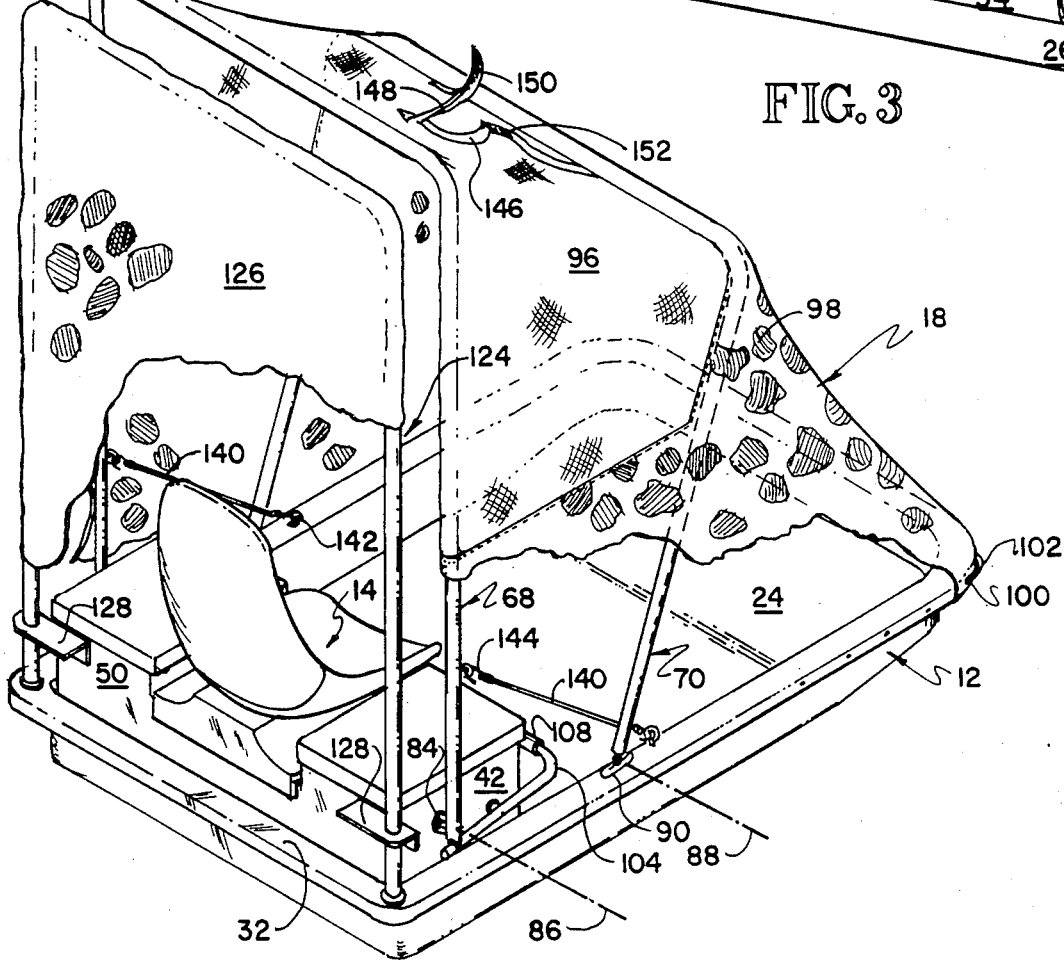
FIG. 2 is an isometric view of the game blind of this invention from the rear thereof, certain parts being broken away for clarity of illustrating, showing the blind in its camouflaging position.

Referring to FIGS. 1 and 2, a game blind 10 of this invention comprises, as major components, a base 12 having a seat 14 thereon, a framework 16 movable between a first upright or camouflaging position to a collapsed position, camouflage material 18 carried by the framework 16 and means 20 for latching the framework 16 in its upright or first position.

The base 12 is generally rectilinear and comprises a generally flat or planar central section 22 and a generally planar but slightly upwardly inclined forward section or bow 24, shallow side and end walls 26, 28 and flange type sides 30 and ends 32 which lie in a common plane. A downturned lip 34 extends around the periphery of the blind 10 and includes a series of spaced holes 36 along the forward end of the base and partially along the sides for purposes more fully explained hereinafter.

Although the base 12 may be made of any suitable material, it is preferred that it be constructed of conventional fiberglass construction including one or more layers of fiberglass cloth and one or more layers of resin. Such a construction is relatively slick on the bottom and can be pulled without great difficulty over marshy type terrain. In addition, it does not rust or degrade from the elements except for sunlight which can readily be avoided by painting or gel coating the upper surface of the base 12.

Mounted on the rear of the base 12 is a dry box 38 of generally rectilinear shape. The container section 40 of the dry box 38 may be of any suitable construction and may include a bottom wall 42 or may use the central section 22 of the base as the bottom wall. Preferably, the container section 40 spans substantially the entire distance between the side walls 26. The container section 40 is illustrated as including a vertical front wall 44, side walls 46, 48 and a rear wall 50. The dry box 38 is also preferably made of fiberglass construction and preferably is permanently secured to the base 12, as by the use of a conventional bracket 51 and suitable rivets, adhesive or the like. In such fashion, the base 12 and dry box 38 provide a structure of surprising strength.

The dry box 38 may either be segmented to provide two or more compartments inside or may provide a single receptacle therein. Preferably, at least one partition wall 52 inside the container section 40 divides the dry box 40 into a pair of spaced receptacles and provides rigidity to the container section 40 which comprises a support for the seat 14. The lid 54 of the dry box 38 may also be either segmented or of one piece construction. Preferably, the lid 54 is segmented providing a central section 56 rigid with the container section 40 and having connected thereto the seat 14. On each side of the central section 56, lid segments 58, 60 close the open upper ends of the container section 40. Suitable handles 62 may be provided, if desired.

The lid segments 58, 60 preferably merely rest on top of the open sections of the container section 40 although they may be pivotally connected thereto or otherwise tethered to the dry box 38 if desired. By making the central lid section 56 rigid with the container section 40 and securing it to the partition wall 52, the dry box 38 provides an exceptionally sturdy support for the seat 14.

The seat 14 may be of any suitable type having a base 64 on which the user sits and preferably includes a back 66 against which the user may lean. The back 66 is preferably pivotally connected to the base 64 to shorten the blind 10 when in a collapsed condition for storage. With the framework 16 down and the seat back 66 pivoted onto the base 64, the blind 10 is so compact it can be easily placed in the back an ordinary station wagon. Typically, the seat 14 is an injection molded piece made of an organic polymeric material.

The framework 16 comprises a pair of inverted generally U-shaped rearward and forward struts 68, 70. The struts 68, 70 comprise a pair of generally vertical legs 72, 74, 76, 78 which are spaced apart by transverse legs 80, 82 a distance substantially the same as the distance between the flange sides 30. The lower ends of the legs 72, 74, 76, 78 are movably connected to the base 12 in any suitable manner for movement between a first generally upright position shown in FIG. 2 and a second or collapsed position shown in dash-dot lines in FIG. 1. To this end, the legs 72, 74 of the strut 68 are pivotally connected to the dry box side walls 46, 48 by brackets 84 for pivotal movement about an axis 86. Similarly, the legs 76, 78 of the strut 70 are pivotally connected to the flange side walls 30 for movement about an axis 88 by suitable brackets 90 of any suitable design. Thus, the struts 68, 70 are mounted for independent pivotal movement, i.e. without the camouflage material 18, the struts 68, 70 are capable of pivoting independently of one another.

Extending across the transverse legs 80, 82 and partially down the vertical legs 72, 74, 76, 78 is a foam rubber sleeve 92, 94. The sleeves 92, 94 prevent the metal struts 68, 70 from rattling when the framework 16 is collapsed and the blind 10 is being pulled to its destination. In addition, the sleeves 92, 94 prevent damage to the struts 68, 70 and the base 12 when the framework 16 is collapsed, as will be pointed out more fully hereinafter.

As shown in FIG. 2, the struts 68, 70 are interconnected by the camouflage material 18 and consequently move in a somewhat interrelated fashion. The camouflage material 18 preferably includes an upper section 96 of netting or other partially transparent material, i.e. material which can partially be seen through but which obscures the outline of the hunter. The upper section 96 conveniently, but not necessarily, spans the gap between the first and second struts 68, 70 along the top of the blind 10 and partially down the sides. A lower section 98 of camouflage material preferably spans from the second or forward strut 70 down to the front of the base 12 as well as to the lip 34 adjacent the forward end of the base 12. The bottom of the lower camouflage section 94 includes a series of openings 100 which receive a cord or small rope 102. The rope 102 is looped through the openings 36, 100 to provide an anchorage for the material 18. As best seen in FIG. 1, the openings 36 extend only partially around the forward end of the base 12. It will be appreciated that the material 18 should allow the struts 68, 70 to move relative to the base 12. To this end, the material 18 is secured to the base 12 forwardly of the struts 68, 70 but not between the struts 68, 70.

Figure 3:
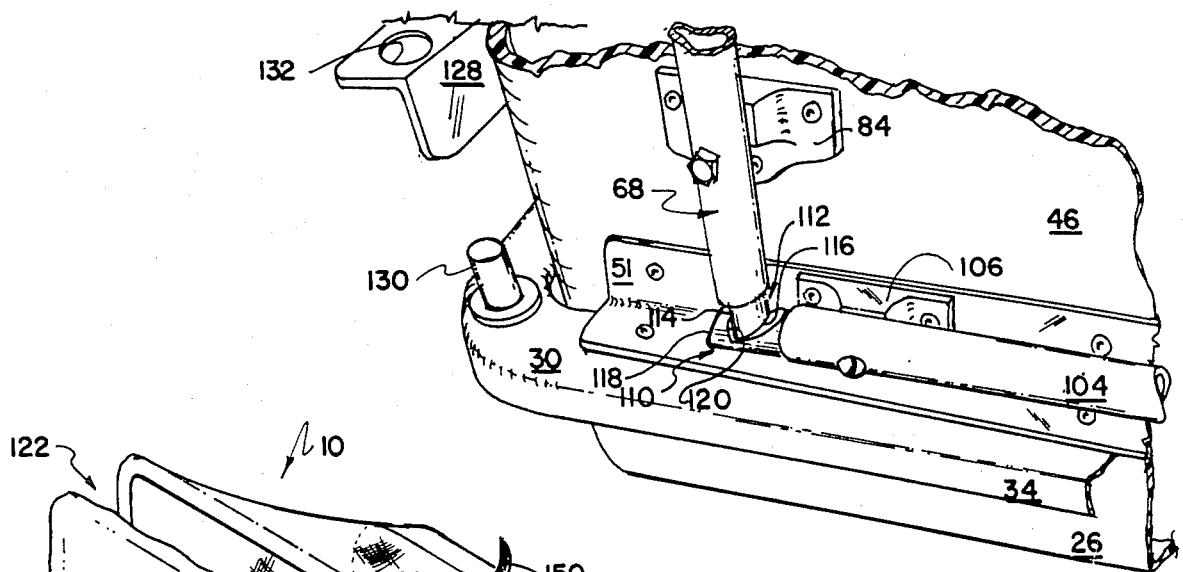
FIG. 3 is an enlarged view of the latch mechanism used to temporarily hold the framework its camouflaging position.

The framework 16 is movable between a collapsed position in which the struts 68, 70 rest on the base 12 to an upright or camouflaging position in which the netting 96 and camouflage cloth 98 are disposed in front of the seat 14. As shown best in FIG. 3, the latch 20 holds the framework 16 in the upright position while the hunter waits for game to appear to the front or sides of the blind 10.

The latch 20 comprises a lever 104 pivotally connected by a bracket 106 to the bracket 51 and includes a first end 108 which is an operating handle or pedal to trip the latch 20. The latch 20 includes a second end 110 arranged to cooperate with an end 112 of the rear strut 68. To this purpose, the end 112 comprises a solid member rigidly received in the end of the strut leg 72 and includes a wedge shaped segment having a rear vertical side 114 and a cam or inclined side 116. The end 110 comprises a solid member received in the end of the lever 104 and includes an inclined cam surface 118 and a slot having a vertical wall 120. Preferably, the end 110 is adjustably mounted in the end of the lever 104 to allow adjustment between the strut 68 and the latch 20. Experience has shown that if the camouflage material 18 shrinks during use, the rear strut 68 may not be able to be pulled to its latching position with the latch 20 and something has to give. Although the camouflage material 18 could be laced to the framework 16 and thereby adjusted, in the present scheme of things, it is easier to adjust the latch 20.

To the rear of the seat 14, there is provided means 122 for camouflaging the rear of the blind 10. The camouflaging means 122 comprises an upstanding inverted U-shaped strut 124 having a camouflage cloth cover 126 pulled thereover. Although it is preferred that the blind 10 be backed up to a bush or tree to help break the outline of the blind 10, this luxury is often not available and the camouflaging means 122 is therefor desirable. In addition, the camouflaging means 122 affords a substantial measure of protection against wind and rain. It is desirable that the means 122 be removable or collapsible in order to allow easy transportation of the blind 10.

To these ends the strut 124 is removably attached to the base 12 by the provision of brackets 128 secured to the back 50 of the dry box 32. The brackets 128 provide openings therethrough receiving the lower ends of the strut legs. A pair of upstanding posts 130 receive the lower hollow ends of the strut legs and assist in holding the strut 124 upright. For storage, the strut 124 is removed from the brackets 128, the cover 126 is pulled off and placed in the front of the base 12 and the strut 124 is placed under the overhanging lip of the base 12 as shown in FIG. 1. The legs of the strut 124 pass through a pair of spaced aperatured brackets 132 on each side of the base 12 to hold the strut 124 during transport.

In order to tow the blind 10 to and from a hunting site, a pair of connections 134 are secured to the forward end of the base 12 and receive a pair of two straps 136 having a harness 138 on the end thereof. Because the forward end or bow 24 of the blind 10 is slightly upwardly inclined, the base 12 readily negotiates small undulations or obstructions on the ground. Because the U-shaped end of the strut 124 is facing forwardly, there is no tendency for the strut 124 to be pulled out of its connection with the base 12 and be inadvertently left behind. In addition, with the seat 14 on the rear of the base 12, the base 12 does not rock when the hunter sits thereon.

In use, the blind 10 is conveniently towed by the hunter to the hunting site. The blind 10 is preferably backed up to a tree or bush facing in the direction that the approach of game is expected. If the hunter is using decoys, as in water fowl hunting, they may be carried on the central section 22 of the base 12 and are deployed to the front of the blind 10. The hunter pulls the strut 124 from its stowage position shown in FIG. 1 and assembled as shown in FIG. 2. The hunter then sits on the seat 14 and pulls upwardly on the rear strut 68 to elevate the framework 16 and the camouflage material 18 carried thereby to its upright or camouflage position obscuring the hunter from sight.

When game birds approach within range of the blind 10 and the hunter decides to fire, the hunter pulls upwardly on the pedal 108, thereby moving the end 110 downwardly and disengaging the latch 20 from the strut 68. Because of the inclination of the strut 70 and the weight of the camouflage material 18, the framework 16 falls by gravity away from its upright position shown in FIG. 2 toward its collapsed position. Because the rate of movement of the framework 16 is not sufficiently fast, elastic members 140 are connected between the framework 16 and the base 12. The elastic member 140 are conveniently of the bunge cord type and include conventional eyes 142 and hooks 144 to place the cords 140 in tension when the framework 16 is elevated. When the latch 20 is tripped, the elastic cords 140 assist in dropping the framework 16 away from its camouflaging position. As soon as the framework 16 falls away from the front of the hunter, the hunter fires a shotgun (not shown) over the top of the collapsed, or collapsing, framework 16 at the game birds.

If the hunter is successful in killing a bird, it is retrieved and placed either in the front of the blind 10 or in one of the compartments of the dry box 38.

A slit 46 is provided in the netting 96 to allow a camera lens or rifle barrel to pass through the netting 96. This allows either a camera buff or a rifle hunter to use the blind 10. Conveniently, a closure strip 148 and Velcro fastener strips 150, 152 may be used to close the slit 146.

Although the invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A game blind comprising
    a base having a ground engaging generally flat bottom wall including an upturned end and upturned sides and a seat thereon for a person;
    a framework movably mounted on the base for gravitational movement from a first generally upright position to a second generally collapsed position;
    camouflage material carried by the framework for disguising a person in the seat in the first position of the framework;
    means for towing the base along the surface of the earth in the direction toward the upturned end including tie downs mounted on the game blind adjacent the upturned end and an elongate tow device including a harness; and
    latch means for retaining the framework in the first position comprising a single release trigger adjacent the seat and operable by the person when seated therein.

2. The game blind of claim 1 wherein the base is of generally rectilinear configuration, the seat is adjacent a first end of the base, the framework includes a strut pivotally connected to the blind adjacent the first end thereof for movement from the first position generally overlying the seat to the second position resting on the base.

3. The game blind of claim 2 wherein the strut includes a generally U-shaped inverted member having a pair of generally upright legs having first and second ends and a transverse leg spanning between the upright legs adjacent the second ends thereof, the strut being pivotally mounted to the base adjacent the first ends of the upright legs.

4. The game blind of claim 1 further comprising a spring biasing the framework toward the second position.

5. The game blind of claim 1 wherein the seat comprises a support elevating the seat above the base, the support comprising a container having one movable side providing access to the interior of the container.

6. The game blind of claim 5 wherein the container comprises a rectilinear box, the movable side being the top of the box.

7. The game blind of claim 6 wherein the container comprises a segmented rectilinear box having a pair of removable tops on the sides thereof comprising the movable side and a stationary central section rigid with the box, the central section comprising the seat support.

8. A game blind comprising
    a base having a generally flat bottom wall including an upturned end and upturned sides and a seat thereon for a person;
    a framework movably mounted on the base for gravitational movement from a first generally upright position to a second generally collapsed position, the framework comprising a first inverted generally U-shaped strut having a pair of upright legs having first and second ends and a transverse leg spanning between the upright legs adjacent the second ends thereof, the strut being pivotally mounted to the base adjacent the first ends of the upright legs, and a second inverted generally U-shaped inverted strut having a second pair of generally upright legs having first and second ends and a second transverse leg spanning between the second upright legs adjacent the second ends thereof, the second strut being pivotally mounted to the base adjacent the first ends of the second upright legs;

camouflage material carried by the framework for disguising a person in the seat in the first position of the framework;

means for towing the base along the surface of the earth in the direction toward the upturned end including tie downs mounted on the game blind adjacent the upturned end and an elongate tow device including a harness; and latch means for retaining the framework in the first position comprising a single release trigger adjacent the seat and operable by the person when seated therein.

9. The game blind of claim 8 wherein the camouflage material interconnects the strut and the second strut.

10. A game blind comprising a base having a seat thereon for a person, the base is of generally rectilinear configuration, the seat is adjacent a first end of the base;

a framework, movably mounted on the base, including first and second struts pivotally connected to the blind adjacent the first end thereof for gravitational movement from a first generally upright position overlying the seat to a second generally collapsed position resting on the base, the struts each include a generally U-shaped inverted member having a pair of generally upright legs having first and second ends and a transverse leg spanning between the upright legs adjacent the second ends thereof, the struts being pivotally mounted to the base adjacent the first ends of the upright legs;

camouflage material carried by the framework for disguising a person in the seat in the first position of the framework;

latch means for retaining the framework in the first position; and a third strut rigidly connected to the blind and located between the seat and the first end of the base and camouflage material carried by the third strut for disguising the user when viewed from adjacent the first end of the base.

11. A game blind comprising a base of generally rectilinear configuration having a seat adjacent a first end thereof for a person;

a framework, movably mounted on the base for gravitational movement from a first generally upright position overlying the seat to a second generally collapsed position resting on the base, the framework including a first strut having a generally U-shaped inverted member having a pair of generally upright legs having first and second ends and a transverse leg spanning between the upright legs adjacent the second ends thereof, the strut being pivotally mounted to the base adjacent the first ends of the upright legs;

camouflage material carried by the framework for disguising a person in the seat in the first position of the framework;

latch means for retaining the framework in the first position;

a second strut removably connected to the blind and located between the seat and the first end of the base and camouflage material carried by the second strut for disguising the user when viewed from adjacent the first end of the base.

* * * * *